United States Patent [19]

Burns et al.

[11] 3,715,284
[45] Feb. 6, 1973

[54] RECOVERY OF PROPYLENE OXIDE FROM CONTAMINANTS BY DISTILLATION IN THE PRESENCE OF ACETONE OR ACETONE-METHANOL MIXTURES

[75] Inventors: Simon Pierce Burns, Austin; Henry Edmund Hartman, Conroe, both of Tex.

[73] Assignee: Jefferson Chemical Company, Inc., Houston, Tex.

[22] Filed: Sept. 16, 1970

[21] Appl. No.: 73,218

[52] U.S. Cl.................203/56, 203/62, 260/348.5 V
[51] Int. Cl.............................C07d 1/08, B01d 3/34
[58] Field of Search..........203/56, 62, 63; 260/348.5

[56] References Cited

UNITED STATES PATENTS

| | | | |
|---|---|---|---|
| 3,338,800 | 8/1967 | Binning et al. | 203/70 |
| 3,350,418 | 10/1967 | Bowe et al. | 203/70 |
| 2,780,634 | 2/1957 | Robertson | 260/348.5 V |
| 3,350,417 | 10/1967 | Binning et al. | 260/348.5 V |
| 3,350,419 | 10/1967 | Null et al. | 203/70 |
| 3,337,425 | 8/1967 | Binning et al. | 260/348.5 V |

*Primary Examiner*—Wilbur L. Bascomb, Jr.
*Attorney*—John R. Kirk, Jr., H. G. Jackson and Terrence D. Dreyer

[57] ABSTRACT

Propylene oxide may be efficiently separated from contaminants present in the propylene/oxygen reaction effluent by adding a liquid boiling between 35°C and 100°C, which is not reactive with propylene oxide, to the reaction effluent and distilling propylene oxide from the resulting mixture. Propylene oxide is useful for the production of petroleum demulsifiers, surface active materials, urethane polyols and propylene glycols.

4 Claims, 1 Drawing Figure

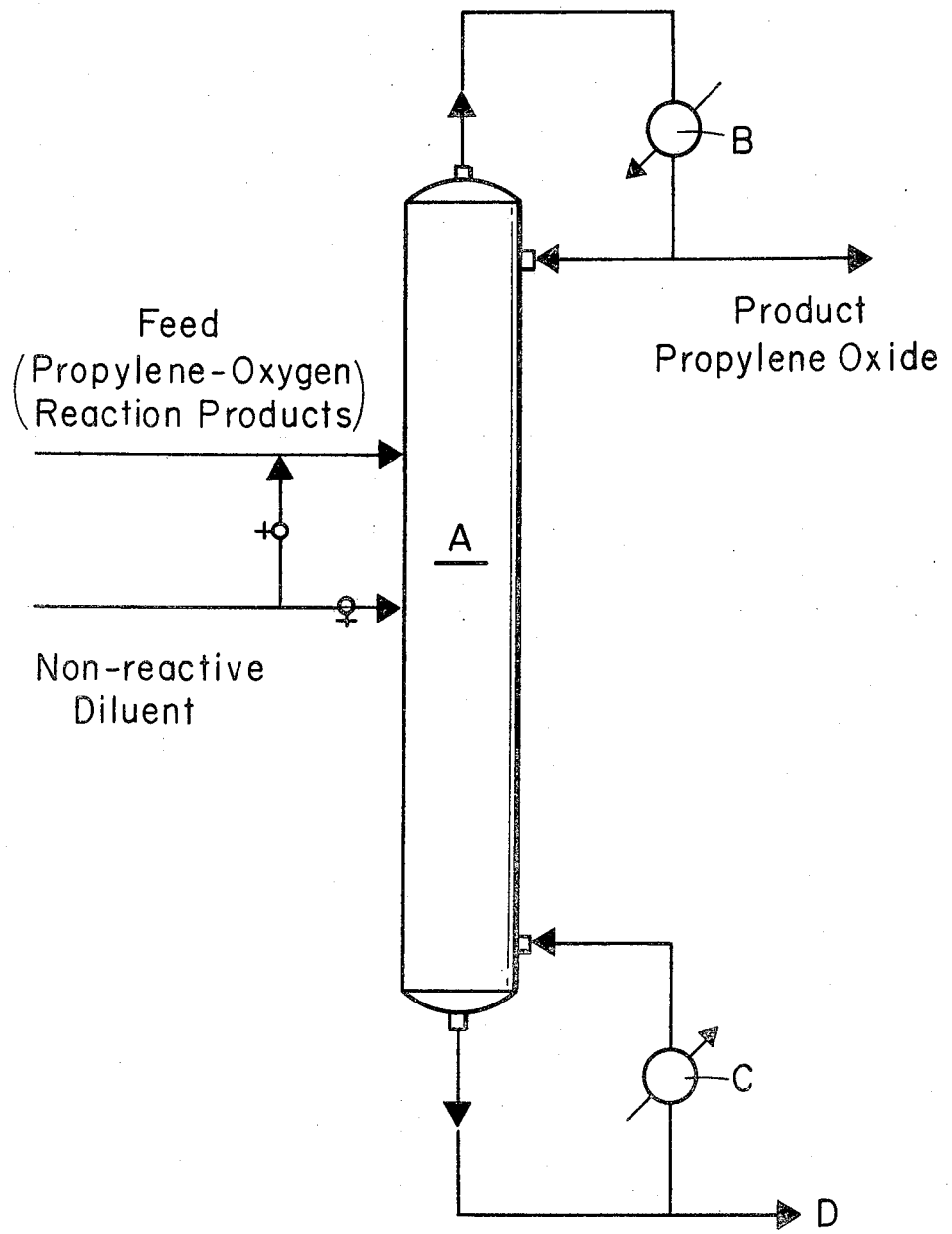

RECOVERY OF PROPYLENE OXIDE FROM CONTAMINANTS BY DISTILLATION IN THE PRESENCE OF ACETONE OR ACETONE-METHANOL MIXTURES

BACKGROUND OF THE INVENTION

1. Field of the Invention

This invention pertains to the field of liquid separation processes.

2. Description of the Prior Art

Liquid phase propylene oxidation processes necessarily involve the problem of separating the propylene oxide product from the other reaction products of propylene and oxygen efficiently and without excessive losses of propylene oxide due, for instance, to its reaction with acids and other high boiling materials reactive with propylene oxide normally found in propylene oxidation reactor effluent.

Prior to the process of our invention, normal distillation processes to recover propylene oxide resulted in excessive losses of propylene oxide due to its reaction with acids and other contaminants. It has been surprisingly discovered that the addition to the distillation column of a liquid boiling between 35°C and 100°C which is not reactive with propylene oxide will increase recoveries of propylene oxide and largely prevent loss of propylene oxide due to its reaction with acids and other high boiling contaminants.

SUMMARY OF THE INVENTION

The invention is a method for recovering propylene oxide from the reaction products of propylene and oxygen which comprises introducing into a distillation column feed containing the reaction products of propylene and oxygen a quantity of a liquid boiling between 35°C and 100°C which is not reactive with propylene oxide and distilling the resultant mixture under conditions such that the propylene oxide and acids or other high boiling materials which are reactive with propylene oxide will remain substantially separated in the column.

BRIEF DESCRIPTION OF THE DRAWING

The sole FIGURE is a schematic drawing of the apparatus in which the present process is performed.

DETAILED DESCRIPTION OF THE DRAWING

In a typical procedure, the feed containing the propylene oxide and other reaction products of propylene and oxygen are fed to a distillation column (A). In addition to the crude feed, acetone or acetone-methanol mixtures are added with said feed or are charged separately to the distillation column. The column is heated by means of a reboiler (c) at the base thereof. The overhead vapors from the column are condensed (B) and refluxed to the column while a portion is removed as distillate propylene oxide product. Bottoms from the column contain the acids or other higher boiling materials (D).

DESCRIPTION OF THE PREFERRED EMBODIMENTS

The reactor effluent of a liquid phase propylene oxidation process contains in addition to the desired propylene oxide product a variety of compounds such as monochlorobenzene, propylene, formic acid, acetic acid, acetone and other reaction products of propylene and oxygen. Some of these products are reactive with the desired product propylene oxide and will, therefore, destroy the propylene oxide and reduce yields.

The process of this invention recovers the propylene oxide from the reaction products of propylene and oxygen by distillation. In order to keep the propylene oxide and compounds reactive with it substantially separated in the distillation column a quantity of a liquid boiling between 35°C (the boiling point of propylene oxide) and 100°C (the approximate boiling point of the acids and other high boiling compounds which are reactive with propylene oxide) is introduced into the distillation column in addition to the propylene/oxygen reaction products. This liquid introduced into the distillation column should not be reactive with propylene oxide. The resultant mixture is distilled under conditions such that the non-reactive added liquid is physically between the propylene oxide and materials which are reactive with propylene oxide in the column during distillation. Thus, most of the propylene oxide will not contact any reactive materials in the column and may be recovered in good yields. The liquid added to the column is preferably acetone or a mixture of acetone and methanol since both are already present in small amounts in the reaction mixture and do not azeotrope with other major components in the reaction mixture.

The amount of additional liquid to be added to the distillation column along with the reaction products of propylene and oxygen may be any amount over about 1 percent based on the total feed to the column. In order to minimize control problems with operation of the column it is preferred that the amount of added liquid not exceed 10 percent based on the total feed to the column.

Since the composition of the propylene/oxygen reaction products may vary, the operating conditions of the distillation column should be adjusted accordingly in order to maintain substantial separation of propylene oxide and acids or other high boiling reactive materials within the column. It is well within the knowledge of one skilled in the art to determine the proper distillation column operating conditions given the reaction product composition and the amount of added liquid.

The following table illustrates the improvement of my invention. Examples 1 and 2 show that with added acetone and proper column operation the recovery of propylene oxide is 95 to 100 percent. Examples 3, 4 and 5 demonstrate that even with added acetone, improper operation of the column (i.e., allowing the propylene oxide and acids, etc., to contact each other) results in considerably lower propylene oxide recoveries. Examples 6 and 7 demonstrate that the absence of added acetone prevents high recovery of propylene oxide regardless of the manner in which the distillation column is operated.

TABLE 1

| Example number | Reflux ratio | Temperature, °C. | | Composition, weight percent | | | | | | | Propylene oxide recovery, percent | Remarks |
| --- | --- | --- | --- | --- | --- | --- | --- | --- | --- | --- | --- | --- |
| | | Head | Reboiler | Feed | | Overhead | | | Bottoms | | | |
| | | | | Oxide | Acetone | Oxide | Acetone | Chlorobenzene | Oxide | Acetone | | |
| 1 | 2:1 | 46–48 | 121–123 | 0.57 | 4.63 | 11.69 | 72.63 | Nil | Nil | 1.98 | 95.6 | Proper operation. |
| 2 | 2:1 | 46–50 | 108–113 | 2.16 | 9.83 | 17.50 | 64.71 | 0.16 | 0.01 | 2.98 | 100.2 | Do. |
| 3 | 2:1 | 48–50 | 122–133 | 0.65 | 2.77 | 7.40 | 77.71 | 0.70 | Nil | 0.20 | 41.5 | Bottoms temperature too high. |
| 4 | 2:1 | 45–52 | 118–131 | 0.69 | 5.36 | 5.83 | 79.54 | 2.02 | Nil | 0.12 | 49.1 | Do. |
| 5 | 2:1 | 44–48 | 104–106 | 2.31 | 10.03 | 20.04 | 57.57 | 0.08 | 0.01 | 4.42 | 87.1 | Bottoms temperature too low. |
| 6 | 2:1 | 77 | 130 | 1.11 | 0.13 | 32.7 | 6.8 | 21.7 | 0 | 0 | 56.6 | No acetone added. |
| 7 | 2:1 | 71 | 130 | 1.48 | 0.11 | 30.2 | 5.7 | 23.6 | 0.1 | 0 | 51.6 | Do. |

We claim:

1. A method for recovering propylene oxide from the reaction products of propylene and oxygen which comprises introducing into a distillation column as feed said reaction products and adding in addition to said reaction products a non-reactive liquid selected from acetone or a mixture of acetone and methanol and distilling the resultant mixture under conditions such that said non-reactive liquid essentially physically separates in said column the propylene oxide from the acids or other high boiling materials which are reactive with the propylene oxide and recovering as overhead the propylene oxide and as bottoms said materials which are reactive with the propylene oxide.

2. A method as in claim 1 wherein said non-reactive liquid is a mixture of acetone and methanol.

3. A method as in claim 1 wherein said non-reactive liquid is acetone.

4. The method as in claim 1 wherein said non-reactive liquid is added in an amount over about 1 wt. percent and not in excess of 10 wt. percent of the total feed to the column.

* * * * *